BOWLER IDENTIFICATION DEVICE

Filed Jan. 30, 1967 3 Sheets-Sheet 1

Inventor
Robert Torresen
By Hofgren, Wegner, Allen, Stellman & McCord
Attys 3,480,276
Patented Nov. 25, 1969

3,480,276
BOWLER IDENTIFICATION DEVICE

Robert Torresen, Muskegon, Mich., assignor to Brunswick Corporation, a corporation of Delaware Filed Jan. 30, 1967, Ser. No. 612,682
Int. Cl. A63d 5/04
U.S. Cl. 273—54 22 Claims

ABSTRACT OF THE DISCLOSURE

A bowler identification panel for use with an automatic bowling scoring system having a plurality of positions in which a pair of indicators for a pair of lanes may be disposed to identify any of a plurality of bowlers to the computing system and including means for precluding the changing of position before a frame is completed, means for precluding simultaneous disposition of the indicators at the same bowler position and means for precluding movement of an indicator to certain of the positions during open bowling.

Background of the invention

In the copending application of Grosvenor et al., Ser. No. 612,568, filed Jan. 30, 1967 there is described a bowling scoring system wherein a single computation means is used to compute bowling scores based on pinfall achieved on a plurality of lanes by a plurality of bowlers. By means of a manually operable bowler identification system, pinfall values achieved by a bowler are associated with that bowler's memory and his score such that the computer will properly attribute the pinfall values to the proper bowler. Specifically, the means for providing bowler identification described in the aforementioned application comprise a group of twenty-four push button operated switching devices for each lane pair. Twelve of the push buttons are associated with each lane in the lane pair, and in the open bowling mode a maximum of six of the twelve push buttons for any given lane are utilized. However, in the league bowling mode each team will use up to six of the push buttons associated with each lane in the lane pair, it being understood that the two teams will use different ones of the push buttons. While the system works well for its intended purpose, in the league bowling mode bowlers tend to become confused by the vast array of push buttons and may erroneously push the wrong push button such that ultimately, pinfall values received by the computer are erroneously attributed to a wrong bowler.

As described in the aforementioned application, it is desirable to provide means for locking a manually operated bowler identification system in a particular bowler identifying position such that the bowler identification to the computer cannot be inadvertently changed to cause erroneous crediting of pinfall to the wrong bowler. Thus a mechanical locking system is provided for each group of six push buttons in the identification system utilized in the above cited application.

Each of the switching devices operated by the push button in the aforementioned prior system include four switch blades and up to eight different contacts. Accordingly, a rather large number of electrical connections are required in order to provide the requisite electrical control circuitry.

The relative complexity of the electrical wiring and the relative complexity of the mechanical locking systems of each bowler panel together with the possibility of confusion on the part of a bowler in operating the bowler panel leaves something to be desired from the economic standpoint of manufacturing cost and the marketing standpoint of bowler acceptance.

Summary of the invention

It is the principal object of the invention to provide a new and improved manually operable bowler identification system.

More specifically, it is an object of the invention to provide a bowler identification panel wherein a slidable member may be placed in any one of a plurality of unique positions, each of the unique positions corresponding to a different bowler.

Another object is the provision of such a bowler panel for use in identifying bowlers to a computer when the bowlers are bowling in league competition and including a pair of such slidable members, each adapted to be associated with a different lane in a lane pair and wherein each of the slidable members has identical unique positions for each of the different bowlers such that the two slidable members, in addition to identifying a bowler and his pinfall information to the computer, indicate the lane on which a bowler is bowling.

A further object is the provision of such a bowler panel including means for locking a slide member in any one of the various unique positions.

Yet another object is the provision of such a bowler panel wherein the slidable member includes a movable carriage, and including a member having a detent corresponding to each of the unique positions of the slide member, means for normally urging a portion of the carriage into engagement with any one of the detents, and means for locking the carriage relative to any one of the detents.

Another object of the invention is the provision of such a bowler panel including means for receiving indicia, such as the name of a bowler, adjacent each of the unique positions of the slidable member and wherein the slidable member includes a manually operable portion adapted to be located adjacent any one of the indicia receiving portions.

Still another object of the invention is the provision of such a bowler panel including a slidable member having a manually operable portion protruding through a slot in a housing, and means for closing the slot regardless of the position of the manually operable member therewithin.

A still further object of the invention is the provision of such a bowler panel wherein the slidable member operates a plurality of switch means respectively for closing different circuits for plural bowlers, the particular bowler circuit closed being dependent upon the position of the slidable member.

Another object is the provision of such a bowler panel wherein the slide member includes a carriage, a manually operable member movable relative to the carriage and for causing movement of the carriage, and a locking mechanism carried by the carriage for precluding relative movement between the carriage and the manually operable portion.

A further object of the invention is the provision of a bowler identification panel for identifying to a bowling score computing system any bowler of two groups of bowlers wherein each group alternates lanes on a pair of lanes during league bowling or bowls on a single lane during open bowling, the panel including a means defining a plurality of bowler identifying positions, one for each bowler; a pair of indicator means, one for each lane, manually movable to each of the bowler positions; a signaling means associated with each indicator means for providing a unique signal for each bowler position; and a means operable during open bowling to preclude movement of one of the indicator means to some of the bowler positions and to preclude movement of the other of the indicator means to the others of the bowler positions.

Yet another object is the provision of a bowler identification panel such as that set forth in the preceding paragraph wherein the precluding means comprise a pair of bails movable into the path of movement of the indicator means to limit movement of the latter.

Another object is the provision of a bowler identification panel for use in a bowler's score computer system used by a plurality of bowlers bowling on two lanes including a means adapted to receive indicia representing each of a plurality of bowlers and defining a plurality of bowler positions, one for each bowler; a pair of indicator means, one for each lane, manually movable to each of the bowler positions; signaling means associated with each of the indicator means for providing a unique signal for each bowler position and a means for precluding a simultaneous disposition of both of the indicator means at the same bowler position.

A still further object is the provision of a bowler identification panel such as that set forth in the preceding paragraph wherein the indicator means comprise a pair of elements slidably mounted on a respective one of a pair of parallel shafts for sliding movement between each of the positions, each of the elements further being mounted on its associated shaft for reciprocating movement in a direction transverse to the longitudinal axis of the shaft; the precluding means comprising a rod at each bowler position disposed for slidable movement between the shafts and the moving means comprising a cam surface on each of the elements adapted to engage the end of the rod located adjacent the end of the shaft on which the element is mounted for shifting the rod toward the other shaft thereby blocking the corresponding bowler position for the other of the movable elements.

Other objects and advantages of the invention will be apparent from the following description taken in connection with the accompanying drawings.

Detailed description

Figures 1, 2:
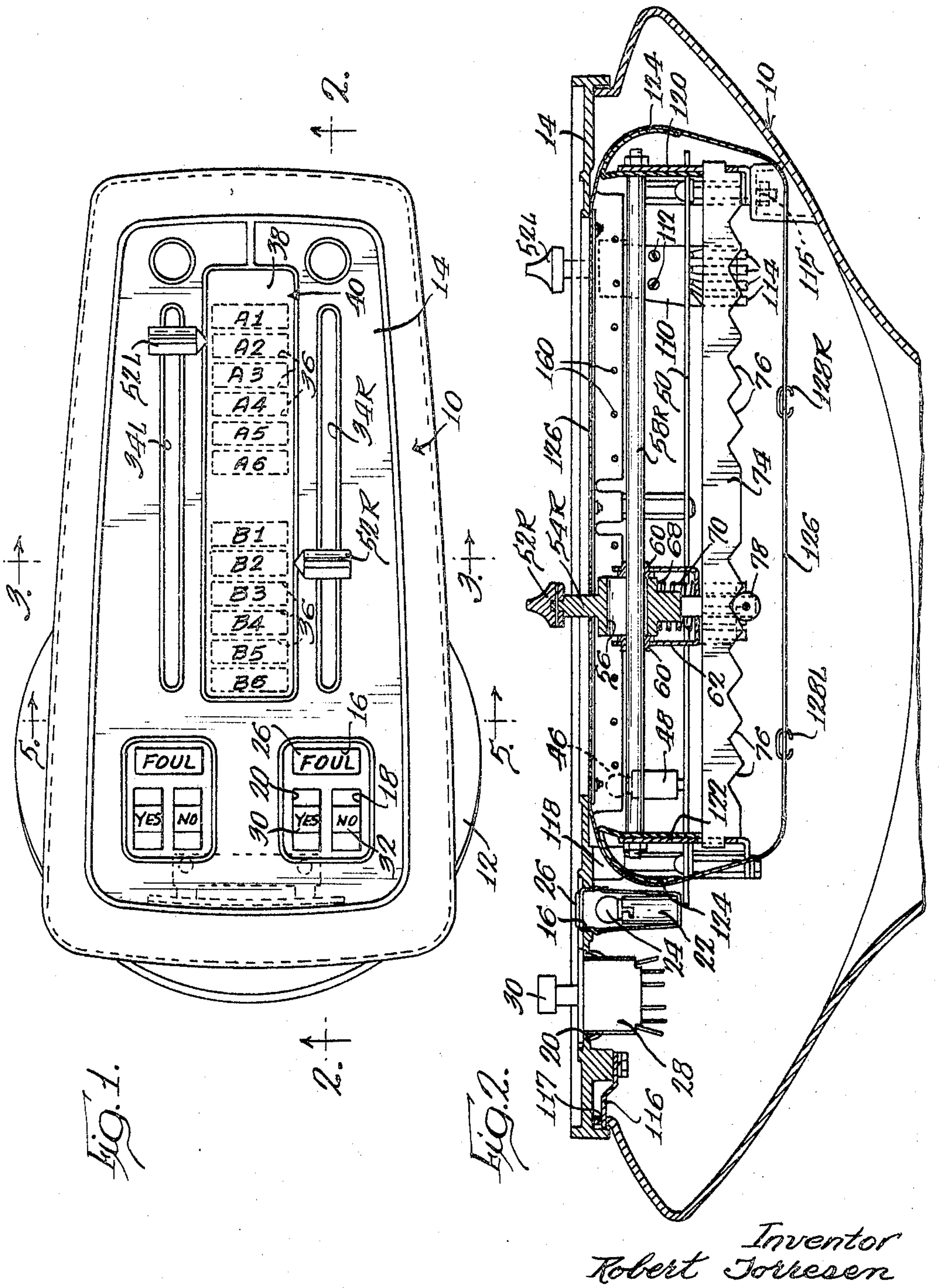
FIG. 1 is a plan view of a bowler panel made according to the invention.
FIG. 2 is a vertical section taken approximately along the line 2—2 of FIG. 1 with certain elements removed for clarity.

Referring now to FIG. 1, an exemplary embodiment of a bowler panel made according to the invention is seen to comprise a housing, generally designated 10, which may be mounted on an upright (not shown) which in turn is mounted on a base 12. The upper end of the housing 10 is closed by a face plate 14 secured to the housing 10 by any suitable means.

If desired, the face plate 14 may include adjacent its lower end, two groups of three apertures 16, 18 and 20. The aperture 16 is adapted to receive an electrical light socket 22 having a lamp 24 as best seen in FIG. 2. Additionally, the aperture 16 may be closed by a transparent or translucent plate 26 bearing the legend "FOUL." As will be apparent to those skilled in the art, the lamp 24 may correspond to the lamp disclosed in the aforementioned application that is lit when a foul is detected by automatic foul detecting equipment.

The aperture 20 may receive a switch 28 having an actuator 30 bearing the legend "YES" and may correspond to the manually operated foul switch disclosed in said applications for verifying the occurrence of a foul. The aperture 18 may be closed by a similar switch having an actuator 32 bearing the legend "NO" which may correspond to the manually operated no foul switch disclosed in said application.

As mentioned above, two groups of the apertures 16, 18 and 20 are provided. The construction and arrangement of the apertures and the associated switches and lamp is identical. However, each group corresponds to a different lane of a lane pair. Thus, when a lamp 24 on the left-hand side of the face plate 14 is lit, it will indicate that a foul has been detected on the left-hand lane of the lane pair. Similarly, the lamp 24 on the right-hand side of the face plate 14 is used to indicate the detection of a foul on the right-hand lane. The switch actuators 30 and 32 are used to verify or deny the occurrence of a foul on their associated lane.

The face plate 14 additionally includes a pair of elongated slots 34R and 34L arranged on the right and left sides of the face plate 14, respectively. Two groups of six apertures 36 are provided in the face plate 14 between the slots 34R and 34L. The upper surface of the face plate 14 surrounding the apertures 36 is relieved as at 38 (FIGS. 1 and 3) for reception of a translucent or transparent plate 40 which is adapted to have the names of the various bowlers bowling on the lane pair written thereon at the locations directly overlying the apertures 36.

Figure 3:
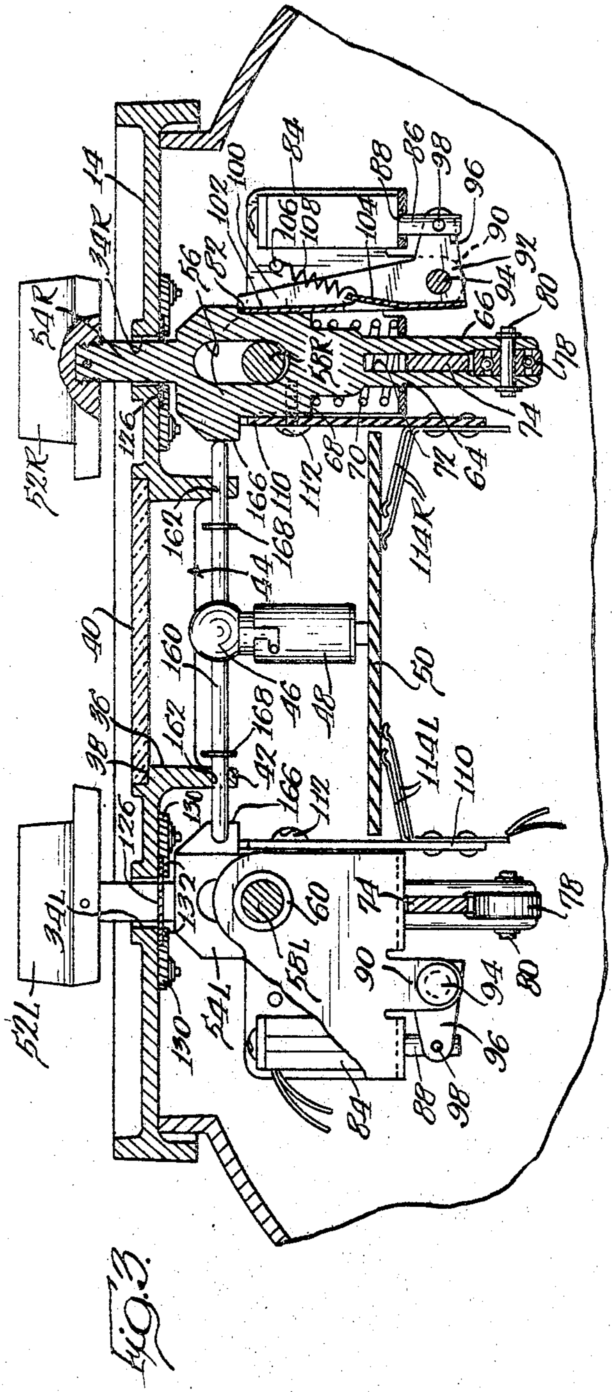
FIG. 3 is a fragmentary vertical section taken approximately along the line 3—3 of FIG. 1 with certain elements removed for clarity.

As seen in FIG. 3, each of the apertures 36 includes a downwardly extending wall 42 about its periphery such that a cavity, generally designated 44 is formed. A lamp 46 is mounted within each cavity 44 by means of a socket 48 supported by a circuit board 50. Accordingly, it will be apparent that when a selected lamp 46 is energized, that portion of the plate 40 overlying the cavity 44 and bearing indicia representative of a bowler's name will be illuminated.

Returning now to FIG. 1, a manually operable pointer knob 52R and 52L is supported for sliding movement adjacent the plate 40 in the slots 34R and 34L respectively. Since the mechanism associated with each of the pointer knobs 52R and 52L and the slots 34R and 34L is identical, each to the other, only the construction with relation to one such mechanism will be described. However, it will be understood that two such mechanisms are used.

As best seen in FIGS. 2 and 3, the knob 52R is mounted as by a set screw on a reciprocal shaft 54R. The shaft 54R includes an inner slot 56 which is parallel to the direction of the slot 34R in the face plate 14. Disposed within the slot 56 is a guide rod 58 which is stationarily supported in the housing 10 as will be described. The slot 56 is elongated in a direction transverse to the longitudinal axis of the shaft 58 such that the shaft 54R may be reciprocated on the shaft 58 in a direction transverse to the longitudinal axis of the latter. A pair of bearings 60 are slidably mounted on the rod 58 and support a U-shaped carriage member 62 (FIG. 2) for slidable movement on the rod 58. The bight of the U-shaper member 62 includes an aperture 64 (see FIG. 3). The shaft 54R is mounted between the bearings 60 supporting the legs of the U-shaped member 62 such that a lower end 66 of the shaft 54 extends through the aperture 64 in the bight of the U-shaped member 62. The shaft 54R also includes, just beneath the lowermost extent of the elongated slot 56, a shoulder 68. A spring 70 is interposed between the shoulder 68 and the bight of the U-shaped member 62 to urge the shaft 54R upwardly as seen in FIGS. 2 and 3.

The lower end 66 of the shaft 54R includes an open slot 72 which is formed in the shaft 54R in a direction parallel to the slot 56. A bar 74 having a plurality of detents formed by notches 76 in its lower edge is received in the slot 72. The bar 74 is stationarily mounted within the housing as will appear such that the notches 76 are aligned with a respective one of the cavities 44 formed by the apertures 36 in the face plate 14. The lower end of the slot 72 is closed by a roller 78 pivotally mounted on the shaft 54R by a pin 80.

From the foregoing it will be apparent that the upward bias applied to the shaft 54R by the spring 70 will normally cause the roller 78 to be urged into one of the notches 76 such that the pointer knob 52R will point toward a portion of the indicia bearing the plate 40 associated with the cavity 44 formed by the aperture 36 in the face plate 14 corresponding to the particular notch 76. It will also be apparent that in order to move the pointer knob 52R to a position adjacent a different one of the cavities 44, the knob 52R must be depressed against the bias of the spring 70 such that the roller 78 will be moved out of the notch 76 in which it is resting. When the shaft 54R has been moved downwardly in the manner just described, the bowler need only exert a force on the knob 52R in a direction parallel to the slot 34R to cause the U-shaped member 62 to slide on the guide rod 58 until the pointer knob 52R is adjacent the desired cavity 44. At this point, the pointer knob 52R may be released whereupon the biasing of the spring 70 will cause the roller 78 to enter the notch 76 associated with the desired portion of the indicia bearing plate 40.

When the invention is used with a bowling scoring system it is desirable to indicate to a bowler that bowler identification should not be changed before a frame is completed, i.e., before the second ball, if required, is rolled in a normal frame or before all bonus balls in the tenth frame, if any, are rolled. Accordingly, the invention provides means operable to indicate to a bowler that bowler identification should not be changed in such instances and the indicating means is in the form of a locking device for each of shafts 54R and 54L that precludes movement thereof when bowler identification should not be changed alhtough, if desired, a light bulb indicator could be used in lieu thereof. The former type of indicator is preferable to the latter in that it will positively indicate to the bowler that identification should not be changed by precluding movement of the shafts 54R and 54L whereas the latter requires the bowler to perceive the indication and make the mental decision not to move the shafts 54R and 54L.

The right-hand edge of the shaft 54R includes a shoulder 82 as best seen in FIG. 3. A solenoid is mounted on the bight of the U-shaped member 62 and has its actuator 86 projecting through an aperture 88 in the bight of the U-shaped member 62. The U-shaped member 62 additionally includes a pair of downwardly projecting tabs 90 which are essentially downward extensions of the legs of the U-shaped member 62. A bell crank 92 is pivotally mounted as at 94 on the tabs 90. A short arm 96 of the bell crank 92 is pivotally connected as at 98 to the actuator 86 of the solenoid while a long arm 100 of the bell crank 92 includes a locking projection 102 running parallel to the guide rod 58R and disposed with respect to the shaft 54R such that projection 102 may be disposed under the shoulder 82 to preclude movement of the shaft 54R against the bias of the spring 70.

The bell crank 92 additionally includes a tab 104. A stud 106 is mounted on one of the legs of the U-shaped member 62 and a biasing spring 108 is connected between the tab 104 and the stud 106 for biasing the bell crank 92 in a clockwise direction as seen in FIG. 3 such that the locking projection 102 will normally be urged out of the path of the shoulder 82. The over-all arrangement is such that when the solenoid 84 is actuated, the bell crank 92 will be rocked against the bias of the spring 108 in a counterclockwise direction to cause the projection 102 to move under the shoulder 82 and thereafter prevent downward movement of the shaft 54R until the solenoid 84 is deenergized. Of course, it will be appreciated that when the shaft 54R cannot be moved downwardly, it will be locked in a given one of the notches 76. That is to say, when the solenoid 84 is energized to ultimately preclude downward movement of the shaft 54R, the pointer knob 52R may not be moved to a position adjacent another one of the cavities 44 defined by the apertures 36 in the face plate 14.

As best seen in FIG. 3, the side of the shaft 54R opposite the shoulder 82 supports a board 110 formed of insulating material. The board 110 is secured to the shaft 54R for sliding and up and down movement therewith by means of screws 112. The lower end of the board 110 mounts a plurality of spring fingers or brushes 114 which, when the shaft 54R is in its uppermost position relative to the U-shaped carriage member 62, bear against the lower surface of the board 50 to make electrical contact with a printed circuit thereon as will appear. Specifically, as best seen in FIG. 2, each board 110 supports four of the brushes 114.

Referring once again to FIG. 2, the means for mounting the printed circuit board, the two guide rods 58, and the two bars 74 in their stationary positions relative to the face plate 14 include four lugs 118 (only one of which is shown) mounted on the underside of the face plate 14. Two of the four lugs 118 support a vertical plate 120 while the remaining two of the four lugs 118 support a vertical plate 122, each of the plates 120 and 122 being arranged transversely to the guide rods 58 and the bars 74. Each of the plates 120 and 122 includes a plurality of apertures (not shown) for receiving the guide rods 58, the bar 74 and the ends of the circuit board 50, although if desired horizontally arranged tabs may depend from the support plates 120 and 122 and upon which the printed circuit board 50 may be mounted. The guide rod 58 and the bars 74 may be secured to the transverse support plates 120 and 122 by any suitable fastening means. The entire assembly is secured to the housing 10 by means of a single screw 115 and by two tabs 116 (only one of which is shown) secured to the underside of the face plate 14 that projects through a pair of apertures 117 (only one of which is shown) in the upper extremity of the housing 10, thereby making the entire assemblage readily removable and accessible for servicing.

Each of the transverse end members 120 and 122 additionally support arcuate guide members 124. The arcuate guide members 124 serve to guide movement of a flexible closure, such as a flexible metal tape 126, for closing the slots 34R and 34L. The tape 126 is apertured at its midpoint for receiving the shaft 54 and is drawn about the arcuate guide members as shown in FIG. 2 to form a loop. A clip 128 is used to secure the ends of the tape 126 together. In order to maintain the upper run of the closed loop of tape 126 in close proximity to the associated one of the slots 34L or 34R, a pair of guide members 130 are disposed on either side of the slots 34L and 34R along the length thereof and include flanges 132 projecting toward the associated slot for sandwiching the tape 126 against the under surface of the face plate 14. Thus, it will be apparent that when one of the pointer knobs 52L or 52R is depressed against the bias of its associated spring 70 and slid along its associated guide rod 58, the associated tape 126 will slide relative to the flanges 132 and the arcuate guide members 124 and maintain the associated slot 34L or 34R closed at all times. This is an extremely desirable feature insofar as it precludes the entry of foreign material into the housing 10 where it could interfere with the operation of the mechanism or the electrical components.

Figure 4:
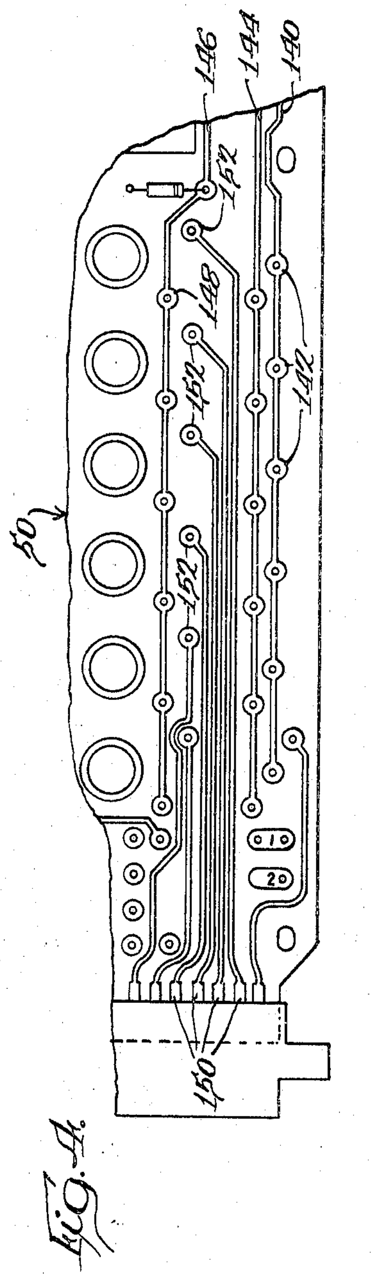
FIG. 4 is a fragmentary plan view of a printed circuit board forming a part of the switch means and bowler identification circuits used in the bowler panel.

Turning now to FIG. 4, a portion of the printed circuit board 50 is shown in greater detail. On the underside of the printed circuit board 50 is printed a conductive strip 140 having twelve contact portions 142 (only six are shown) which may be arranged in conjunction with an appropriate one of the brushes 114 for transmitting a PRINTER START signal when the appropriate brush 114 is electrically connected to one of the contacts 142. The PRINTER START signal is used in the bowling scoring system described in the above cited application to position a printer.

The circuit board 50 includes second and third printed strips 144 and 146 respectively having twenty-four contacts 148, twelve of which are shown. The strips 146 and 144 are used to connect an associated one of the solenoids 84 across the source of power to energize the solenoid and maintain the pointer knob 52R or 52L locked in a desired position. Additionally, the contacts 148 may be used to energize an associated one of the lamps 46, indicating the bowler playing.

Additionally, there are provided six conductive printed strips 150 each of which terminates in a contact 152. The contacts 152 are arranged physically with respect to the board 50 such that an electrical circuit is formed therebetween and an appropriate one of the brushes 114 for each position of the pointer knob 52. Accordingly, it will be apparent that the resultant signals generated by closing of the contacts 152 with a brush 114 may be used to control memory word selection and/or printer positioning as described in the above cited application.

The contacts 142, 148 and 152 are arranged with respect to each other such that for any given position of the pointer knob 52, one of each of the contacts 142 and 152 will be contacted by an appropriate one of the brushes 114 while a contact 148 on each of the strips 146 and 144 will be contacted by appropriate brushes 114 such that two of the contacts 148 are contacted in any given instance. In order to provide for signal generation for each position of each of the pointer knobs 52R and 52L, three additional conductive strips 140, 144 and 146 (not shown) are provided on the circuit board 50 for knob 52L. Additionally, it is necessary to provide three additional groups of the strips 150 such that each pointer knob 52 is used in conjunction with one of each of the strips 140, 144 and 146 and two groups of the strips 150.

Means are also provided for precluding the locating of both of the pointer knobs 52L and 52R at the same bowler location on the face plate 14. The desirability of such a means will be particularly evident when it is considered that when both of the pointer knobs 52L and 52R are at the same location, the computer of the above cited application will be informed that the same bowler is bowling simultaneously on two lanes and since, of course, this is impossible, pinfall could erroneously be credited to the wrong bowler.

Figures 5, 6:
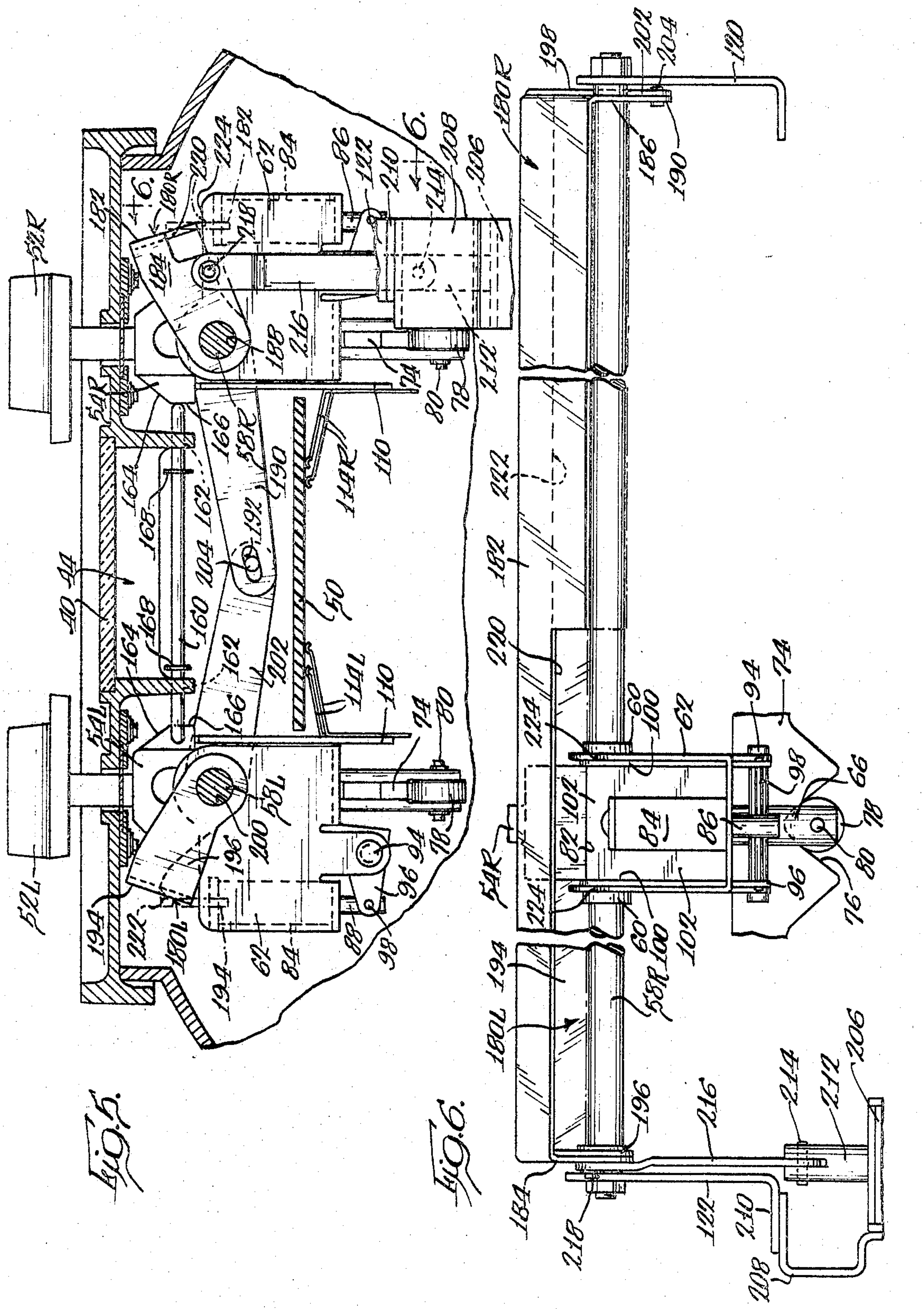
FIG. 5 is a fragmentary vertical section taken approximately along the line 5—5 of FIG. 1.
FIG. 6 is a fragmentary side elevation illustrating the elements removed from FIG. 2.

As best seen in FIG. 5, the means for precluding the simultaneous identification of the same bowler on both lanes includes a plurality of rods 160, one for each bowler position, (only one of which is shown) slidably mounted in aligned apertures 162 on opposite sides of the downwardly extending wall 42 and in a direction generally transverse to the direction of elongation of the slots 34R and 34L. The location of the apertures 162 in the downturned wall 42 of each cavity 44 is such that the corresponding rod 160 when slidably received in the apertures 162 will not interfere with the associated lightbulb 46 (see FIG. 3).

The shafts 54L and 54R each include at their upper extremity and on their mutually facing surfaces a diagonally arranged cam surface 164 which terminates in a vertically arranged blocking surface 166.

Both the cam surfaces 164 and the blocking surfaces 166 are arranged to contact their respective ends of the rods 160 and the arrangement is such that the length of the rod 160 is somewhat longer than the distance between the blocking surfaces 166 of the shafts 54L and 54R. Additionally, washers 168 may be disposed about the rod 160 and secured as by clamping to be movable with the rod 160 within the cavity 44 to limit movement of the rod 160 within the apertures 162.

The manner in which the rods 160 together with the surfaces 164 and 166 preclude the locating of both shafts 54L and 54R at the same bowler position will be described hereinafter.

The manner of using the bowler panel is as follows. If, for example, two teams are bowling in league competition which, under current rules, requires each team to alternate lanes upon the completion of a frame, the bowlers in each team may cause their names to be placed at various locations upon the translucent plate 40. For example, the first through fifth bowlers on team A would place their names at the locations designated A1–A5 as seen in FIG. 1, while the first through fifth bowlers of team B would place their respective names in the positions B1–B5. If team A was to initiate its bowling on the left-hand lane, bowler number one on team A would cause the pointer knob 52L to be placed adjacent the location A1. Of course, the members of team B would start bowling simultaneously on the right-hand lane and the first bowler of team B would therefore cause the pointer knob 52R to be disposed adjacent the location B1.

When each of the members of team A has bowled a frame on the left-hand lane, current American Bowling Congress regulations require that the members of team A switch lanes to bowl their second frame on the right-hand lane. Accordingly, when the members of team B have completed bowling on the right-hand lane, the first bowler of team A will dispose the pointer knob 52R adjacent the location A1. Similarly, when the bowlers on team B are to bowl on the left-hand lane, they will place the pointer knob 52L adjacent an appropriate one of the locations B1–B5.

When the pointer knob 52L or 52R is released and the corresponding roller 78 seats in a notch 76, the brushes 114 will complete various circuits (not shown) by making an electrical connection with various ones of the contacts 142, 148 and 152. One such circuit that may be completed is that connecting the lamp 46 in the cavity 44 adjacent the pointer knob such that the bowler name indicia on the translucent plate 40 at the position in which the pointer knob is located will be illuminated. As mentioned previously, the other completed circuits may be used for controlling a printer which will print out a computed bowling score and for controlling the selection of a particular word in the memory of the computer of the bowling scoring system.

If, for some reason, it is attempted to locate both of the knobs 52L and 52R at the same bowler identifying location, only one of the shafts 54 will be permitted to rise sufficiently so that the brushes 114 will make contact with the circuit board 50. As illustrated in FIG. 5, it will be apparent that when the knob 52R is manipulated so as to move the shaft 54R to a particular bowler identifying position, the upward movement of the shaft 54R with respect to the guide rod 58 under the influence of the spring 70 will cause the cam surface 164 to engage the rightmost end of the rod 160 to cause the rod 160 to be moved to the left. In the uppermost position of the shaft 54R, the rightmost end of the rod 160 will engage the blocking surface 166 associated with the shaft 154 thereby making it impossible to move the particular rod 160 to the right until the shaft 54R is relocated at another bowler position.

If at this time, it is attempted to move the knob 52L to the corresponding bowler position, it will be apparent that when the knob 52L is released for upward movement, the cam surface 164 will engage the leftmost end of the rod 160, and since the latter cannot be moved to the right, the shaft 54L will be prevented from reaching its uppermost position to prevent the contacts 114L from contacting the circuit board 50 thereby precluding the electrical circuitry from indicating to the computer that the same bowler is bowling simultaneously on both lanes.

The foregoing description of operation describes the mode of operation in league bowling. However, as is well known, so-called "open" bowling wherein players do not alternate lanes is very popular and to provide a device with a great deal of flexibility, it is necessary that it be adaptable for use in open bowling. As will be recognized from the foregoing description, the bowler panel is capable of providing for open bowling. However, if no more than the already described structure were to be included, it would be possible for pinfall earned on the left lane serviced by the bowler panel to be attributed to a bowler bowling on the right-hand lane by virtue of erroneous manipulation of the pointer knob 52L. That is, because the bowler panel is constructed so that the mechanisms associated with a particular pointer knob may identify any player of two separate groups of players, each group bowling on a single lane, it is possible through improper manipulation of the pointer knobs during open bowling to identify to the computer a bowler from the wrong group, thereby causing pinfall earned on, say, the right lane to be attributed to a member of the group bowling on the left lane.

Thus, a means is provided for precluding erroneous identification of bowlers during open bowling by limiting movement of the pointer knobs to player positions within a single group of the two groups of bowlers. The means that performs this function is best illustrated in FIGS. 5 and 6 and is seen to comprise a pair of latch bails 180R and 180L which limit movement of the left and right-hand carirages respectively to bowler identifying positions in but a single group.

The bail 180R includes a bight 182 and a pair of legs 184 and 186 respectively. Each of the legs 184 and 186 include an aperture 188 through which the shaft 58R projects. The arrangement is such that the bail 180R is pivotally mounted about the shaft 58R at very nearly the ends of the latter.

The leg 186 of the bail 180R includes an extension 190 that projects a substantial distance toward the shaft 58L and includes an elongated slot 192 at its leftmost end as seen in FIG. 5.

The bail 180L includes a bight 194 and a pair of legs 196 and 198 respectively which each include apertures 200 which rotatably mount the bail 180L about the shaft 58L in the same manner that the bail 180R is pivotally mounted on the shaft 58R. The leg 198 of the bail 180L includes an inwardly directed extension 202 that projects toward the shaft 58R a substantial distance and has at its rightmost end as seen in FIG. 5, a pin 204 which is received in the slot 192 of the extension 190 to provide a lost motion connection.

A solenoid 206 is supported by a bracket 208 which depends from a tab 210 on the lower extremity of the vertical plate 122. The solenoid includes a plunger 212 having a pivotal connection 214 at its upper end to a link 216 which in turn has a pivotal connection 218 to the leg 184 of the bail 180R at a point displaced from the pivot axis thereof provided by the shaft 58R.

As a result of the just described construction, it will be apparent that when the solenoid 206 is energized, the plunger 212 thereof will be drawn downwardly thereby drawing down the link 216 which in turn will cause the bail 180R to pivot clockwise about the shaft 58R as seen in FIG. 5. As a result of the pivotal movement of the bail 180R, the extension 190 of the leg 186 will move upwardly as seen in FIG. 5 and by virtue of the lost motion connection provided by the slot 192 and the pin 204, the bail 180L will be caused to pivot counterclockwise about the pivot axis provided by the shaft 58L.

The bail 180R includes an elongated notch 220 formed in the underside of the bight 182 which extends approximately from the center of the bight 182 leftwardly to the leg 184 as seen in FIG. 6. Similarly, the bail 180L includes a notch 222 formed in the underside of the bight 194 which extends approximately from the midpoint of the bight 194 rightwardly to the leg 198 as seen in FIG. 6.

Referring to FIG. 5, the attitude of the bails 180L and 180R with regard to their respective pivotal axes, when the solenoid 206 is deenergized, is illustrated. It will be recalled that each carriage 62 is formed of a generally U-shaped member. The legs of the U-shaped member comprising the carriages 62 terminate in an upper surface 224 at a height that enables the carriage 62 to move freely under its corresponding bail when the solenoid 206 is deenergized. However, when the solenoid 206 is energized and the bails 180R and 180L are moved to the position illustrated in dotted lines in FIG. 5, the lower extremity of the unnotched portion of the bights 182 and 194 will be moved into a position below the surface 224. As a result, a side of the corresponding notch 220 or 222 will block movement of the carriage 62 to the right of the center of the bail 180R or to the left of the center of the bail 180L.

Thus, when the solenoid 206 is energized, the carriage 62 associated with the pointer knob 52R can only be moved between the bowler identifying positions B1–B6 as illustrated in FIG. 1 while the pointer knob 52L will be limited to movement between the bowler identifying positions A1–A6 as seen in FIG. 1.

By providing the operator of a bowling lane with a suitable switch and power source for selectively energizing the solenoid 206, the bails 180R and 180L may be interposed in the path of the respective carriages so that the pointer knob 52L may not be disposed adjacent the bowler positions B1–B6 and the pointer 52R may not be disposed adjacent the bowler positions A1–A6 during open bowling thereby precluding erroneous identification to the computer of an improper bowler with the resulting erroneous crediting of pinfall information. Preferably, such a switch for controlling the solenoid 206 will be ganged with the switches described in the above cited application which are used to alternatively condition the computing apparatus for open or league bowling.

In the event one of the pointer knobs 52L or 52R is in the wrong position when the solenoid 216 is energized, the underside of the unnotched portion of the corresponding bail will be brought into contact with the upper surface 224 of the corresponding carriage 62. In such a case, when the carriage 62 is moved to the unnotched portion of the corresponding bail, which movement will be permitted by sliding contact between the underside of the unnotched portion of the bight 182 or 194 on the surface 224, it will be appreciated that full movement of the bail to the dotted line position illustrated in FIG. 5 will no longer be restrained by the upper surface 224 of one of the carriages 62 and at that time both the bail 180L and 180R will be lowered to thereafter preclude movement of the carriages 62 to an erroneous bowler identifying position.

From the foregoing, it will be understood that a manually operable bowler panel made in accordance with the foregoing invention is particularly well suited for use in a bowling scoring system such as that described in the above cited copending application. Furthermore, it will be appreciated that the bowler identification panel of the instant invention provides an extremely simple electrical construction while reducing the complexity of the various mechanical means to a minimum. Finally, it will be understood that a bowler identification panel made according to the instant invention is easily operated by a bowler such that when it is used in conjunction with the bowling scoring system, erroneous scores will be reduced to a minimum by the fact that the simple arrangement of the pointer knobs and bowler identifying locations virtually preclude confusion on the part of the bowler.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A bowler identification panel for use in a bowling scoring system comprising:

(a) elongated guide means;

(b) a manually movable carriage mounted on said guide means for movement relative thereto;

(c) means cooperating with said carriage for detaining said carriage in any one of a plurality of distinct positions in response to movement of said carriage;

(d) indicating means for indicating to a bowler that said carriage should not be moved from a given one of said positions, said indicating means comprising means for locking said carriage in any one of said positions; and (e) means dependent upon the position in which the carriage is detained for providing control information.

2. The bowler identification panel of claim 1 wherein said last-named means comprise switches.

3. The bowler identification panel of claim 2 wherein said switches comprise first contacts mounted on said carriage and second contacts stationarily mounted relative to said carriage.

4. The bowler identification panel of claim 1 wherein said carriage reciprocally mounts a shaft adapted to be grasped by a bowler; said detaining means comprises an elongated member including a plurality of detents, one for each of said distinct positions; said shaft, in one position relative to said carriage, being engaged by one of said detents and in another position relative to said carriage, being disengaged from said detents; said locking means being operative to prevent movement of said shaft from said one position relative to said carriage.

5. The bowler identification panel of claim 4 further including means normally biasing said shaft towards said one position relative to said carriage.

6. The bowler identification panel of claim 4 wherein said locking means are mounted on said carriage and comprise a movable lock member for engaging said shaft to preclude movement thereof; actuator means operable to move said lock member into engagement with said shaft; and means urging said lock member out of engagement with said shaft.

7. An information providing device comprising: a housing including a plate; at least one elongated slot in said plate; an elongated rod stationarily mounted in said housing and parallel to said slot; a carriage mounted on said rod for movement therealong; switch means associated with said carriage for providing information dependent upon the position of the carriage; a shaft movably mounted on said carriage for movement therewith and relative thereto and having a portion thereof protruding exteriorly of said housing through said slot; a bar having a plurality of notches forming detents therein within said housing and parallel to said rod; detent engaging means on said shaft and arranged to engage any one of said notches to locate said shaft and said carriage in any one of a plurality of predetermined positions with respect to said switch means; spring means associated with said shaft and said carriage for normally urging said shaft into a detent engaging position wherein detent engaging means are urged into engagement with one of said notches; a latch movably mounted on said carriage for engaging and maintaining said shaft in said detent engaging position; means normally urging said latch out of engagement with said shaft; means actuable to urge said latch into engagement with said shaft; and sealing means for said housing comprising a member connected to said shaft and abutting said plate adjacent to and spanning said slot, said member being movable with said shaft, and means for holding said member against said plate.

8. A bowler identification panel for identifying to a bowling score computing system any bowler of two groups each comprised of a plurality of bowlers; each group alternating lanes on a pair of lanes during league bowling or bowling on a single lane during open bowling, said panel comprising: means adapted to receive indicia representing each of the plurality of bowlers and defining a plurality of bowler positions, one for each bowler; a pair of indicator means, one for each lane of said pair of lanes, each manually movable to each of said bowler positions; signaling means associated with each of said indicator means for providing a unique signal for each bowler position; and means operable during open bowling to preclude movement of one of said indicator means to some of said bowler positions and to preclude movement of the other of said indicator means to the others of said bowler positions.

9. The invention of claim 8 wherein said precluding means comprises at least one member movable into the path of movement of said indicator means and actuating means for selectively moving said member.

10. The invention of claim 9 wherein said member comprises at least one bail having a notch and movable to engage a portion of said indicator means to restrict movement thereof to the confines of said notch, said actuating means comprising a solenoid connected to said bail.

11. A bowler identification panel for identifying to a bowling score computing system any bowler of two groups each comprised of a plurality of bowlers, each group alternating lanes on a pair of lanes during league bowling or bowling on a single lane during open bowling, said panel comprising: means defining a plurality of bowler identifying positions; a pair of guide means, one for each lane; a pair of indicator means, each mounted for movement on an associated one of said guide means in response to manual manipulation to any of said positions; means movable into the path of movement of said indicator means for limiting movement of one of said indicator means to some of said positions and for limiting movement of the other of said indicator means to the others of said positions; and means adapted to be operated during open bowling for moving said movable means into said path of movement.

12. The invention of claim 11 wherein each said guide means comprises an elongated shaft and each said indicator means includes a carriage slidably mounted on an assoiated shaft; said movable means comprising a pair of bails each pivotally mounted on an associated one of said shafts for pivotal movement between a league bowling position wherein each bail will not engage the carriage on its associated shaft and an open bowling position wherein each bail will engage the carriage on its associated shaft.

13. The invention of claim 12 wherein said shafts are parallel and each said bail includes an elongated notch that permits movement of the associated carriage therewithin, the notch on one of said bails extending from the center of said one bail to one end thereof and the notch on the other of said bails extending from the center of said other bail to the end thereof opposite said one end of said one bail.

14. The invention of claim 11 wherein said movable means is constructed and arranged to permit movement of said one indicator means to said some positions from said other positions and to permit movement of said other indicator means to said other positions from said some positions if said moving means is operated when said one indicator means is in one of said other positions or said other indicator means is in one of said some positions.

15. A bowler identification panel for identifying to a bowling score computing system any of a plurality of bowlers bowling on two lanes comprising: means adapted to receive indicia representing each of the plurality of bowlers and defining a plurality of bowler positions, one for each bowler; a pair of indicator means, one for each lane, each manually movable to each of said bowler positions; signaling means associated with each of said indicator means for providing a unique signal for each bowler position; and means for precluding the simultaneous disposition of both of said indicator means at the same bowler position.

16. The invention of claim 15 wherein said precluding means comprises a plurality of means, one at each bowler position each responsive to the presence of one of said indicator means at its corresponding bowler position for blocking movement of the other of said indicator means to its corresponding bowler position.

17. A bowler identification panel for identifying to a bowling score computing system any of a plurality of bowlers bowling on two lanes comprising: means defining a plurality of bowler identifying positions; a pair of guide means, one for each lane; a pair of indicator means, each mounted for movement on an associated one of said guide means in response to manual manipulation to any of said positions; means at each of said positions movable into the path of movement of said indicator means for precluding disposition of one of said indicator means in the corresponding position; and means responsive to the location of one of said indicator means in any one of said positions for moving the corresponding one of said movable means into the path of the other of said indicating means.

18. The invention of claim 17 wherein said guide means comprises a pair of parallel shafts and each said indicator means comprises an element slidably mounted on the associated one of said shafts for sliding movement to each of said positions, each said element further being mounted on its associated shaft for reciprocating movement in a direction transverse to the longitudinal axis thereof, each of said movable means comprising a rod disposed for slidable movement between said shafts; and said moving means comprises a cam surface on each of said elements adapted to engage the end of each rod located adjacent the shaft on which the element is mounted.

19. The invention of claim 18 wherein each said element includes a blocking surface associated with its cam surface that is adapted to engage the end of each rod located adjacent the shaft on which the element is mounted, the length of each rod being greater than the distance between the blocking surfaces on said elements.

20. A bowler identification panel for a pair of bowling lanes and for use with a bowling score computing system comprising: means defining a plurality of bowler identifying positions, some of said positions corresponding to one of said lanes and others corresponding to the other of said lanes; indicator means manually movable to each of said positions; signaling means associated with said indicator means and responsive to the disposition thereof at each said position for providing a unique signal for each of said positions; and selectively operable means alternatively operable for precluding movement of said indicator means to said some positions while permitting movement thereof to said other positions during open bowling and for permitting movement of said indicator means to each of said positions during league bowling.

21. The combination of claim 20 wherein said indicator means comprises a pair of indicators, one for each lane.

22. A bowler identification panel for a pair of bowling lanes and for use with a bowling score computing system comprising: means defining a plurality of bowler identifying positions, some of said positions corresponding to one of said lanes and other corresponding to the other of said lanes; indicator means manually movable to each of said positions; signaling means associated with said indicator means and responsive to the disposition thereof at each said position for providing a unique signal for each of said positions; and means operable during open bowling for precluding movement of said indicator means to said some positions while permitting movement thereof to said other positions; said last named means comprising a notched bail adapted to be moved into the path of movement of said indicator means and actuating means for moving said notched bail into said path of movement.

References Cited

UNITED STATES PATENTS

| | | | |
|---|---|---|---|
| 1,964,449 | 6/1934 | Carlson. | |
| 1,997,158 | 4/1935 | Thomas | 200—16 X |
| 2,612,557 | 9/1952 | Turner | 200—116 X |
| 2,725,451 | 11/1955 | Huck et al. | |
| 3,146,320 | 8/1964 | Wang et al. | 200—16 X |
| 3,308,250 | 3/1967 | Field et al. | 200—16 |

OTHER REFERENCES

German printed application, 1,058,127, May 27, 1959.

ANTON O. OECHSLE, Primary Examiner

U.S. Cl. X.R.

116—135; 200—50, 167